United States Patent [19]

Ingram

[11] 4,346,365

[45] Aug. 24, 1982

[54] STOPPED VEHICLE WARNING DEVICE

[76] Inventor: Charles E. Ingram, 2906 Orchard Ct., Highland, Mich. 48031

[21] Appl. No.: 75,894

[22] Filed: Sep. 17, 1979

[51] Int. Cl.³ .............................................. B60Q 1/44
[52] U.S. Cl. .................................. 340/72; 340/81 R
[58] Field of Search ...................... 340/72, 70, 69, 67, 340/66, 81 R

[56] References Cited

U.S. PATENT DOCUMENTS

| | | | |
|---|---|---|---|
| 3,596,244 | 3/1968 | Litke | 340/72 |
| 3,693,151 | 9/1972 | Hasegawa et al. | 340/72 |
| 3,740,715 | 6/1973 | Szekessy | 340/72 |
| 3,787,808 | 1/1974 | Knopf | 340/72 |
| 4,013,996 | 9/1975 | Hubbard | 340/70 |

FOREIGN PATENT DOCUMENTS 1111844  5/1968  United Kingdom .................. 340/70

*Primary Examiner*—Donald J. Yusko
*Attorney, Agent, or Firm*—Basile, Weintraub & Hanlon

[57] ABSTRACT

A stopped vehicle warning device comprising a time delay and a flasher to warn approaching vehicles of a stopped or slowing vehicle. The warning device is optionally, integrated into the brake system of the vehicle, such that the brake lights on a vehicle are caused to flash when the brakes have been applied a predetermined length of time by a vehicle being slowed or stopped. The flasher stops and the timer is reset when the brakes have been released.

10 Claims, 6 Drawing Figures

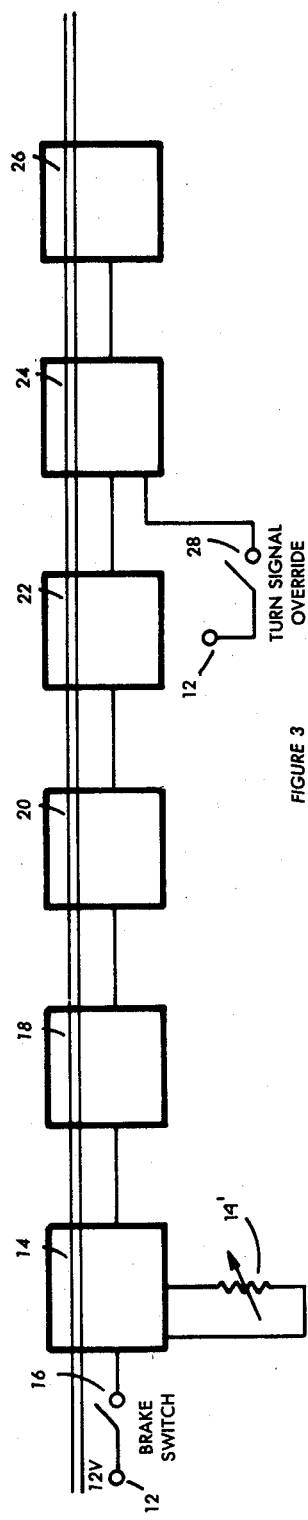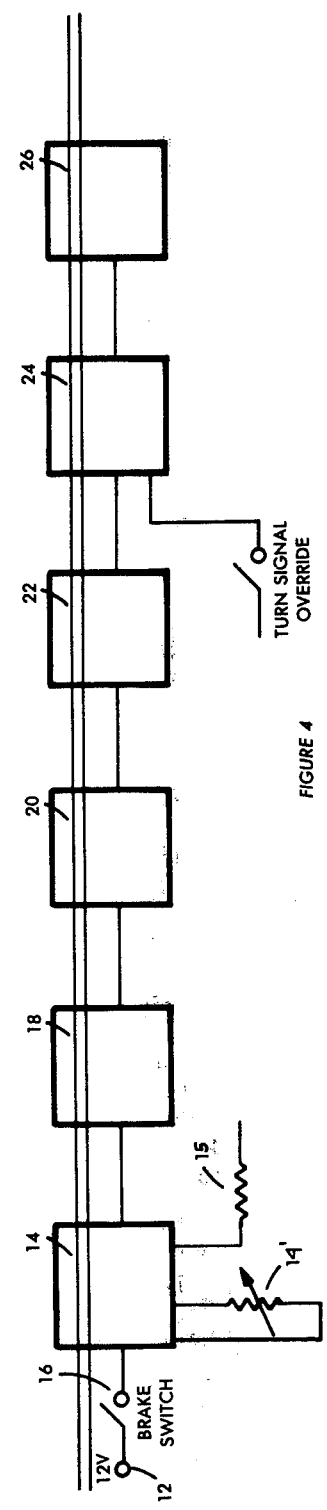

4,346,365

STOPPED VEHICLE WARNING DEVICE

BACKGROUND OF THE INVENTION

1. Field of the Invention

The present invention relates to the field of vehicle safety devices, and more particularly, to the field of vehicle safety devices which provide a warning signal for a stopped vehicle, or a slowing vehicle that has had its brakes applied for a period of time.

2. Description of the Prior Art

The Applicant is aware of the following United States Patents which are related to the field of the present invention: U.S. Pat. Nos. 3,749,982; 4,028,829; 2,822,505; and 2,433,469. U.S. Pat. No. 2,822,505 discloses a direction indicator system employing a blinker to flash the lights to indicate the direction to be taken in a turn. The other above listed U.S. Patents cover inertia actuated warning signals which are of interest in defining the state of the art, but are not directly related to the present invention.

SUMMARY OF THE INVENTION

The present invention provides a device to warn approaching vehicles of a stopped vehicle or a braking vehicle which has been braked or stopped for a prolonged time or in reverse.

The present invention provides a device for warning of a stopped or braking vehicle which uses many components that are currently in production and have an established record for reliability and low cost.

When the brake lights have been activated for a predetermined length of time, the brake lights begin to flash or another attention attracting means is activated. Once the flasher or signalling means has been actuated the signalling continues until the brakes have been released, then the brake lights or signalling means goes out, and the timer is instantly reset. Until the timer has been actuated by the brakes being applied for the predetermined time, the brake lights respond to the brakes being applied in the conventional manner. The electrical circuit is designed to allow the brake lights or other signalling means to function in its original manner in the event any added component required for the time delayed warning device of the present invention should malfunction. The components interposed between the brake switch or the turn indicator switch and their corresponding lights are all normally closed and would fail in the closed position.

Other objects, advantages and applications of the present invention will become apparent to those skilled in the art of stopped vehicle warning devices when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numbers refer to like parts throughout the several views, and wherein:

FIG. 3 illustrates the block diagram of FIG. 1 having a variable time delay;

FIG. 4 illustrates the block diagram of FIG. 3 having the variable time delay modified by vehicle speed;

DESCRIPTION OF THE PREFERRED EMBODIMENT

Figure 1:
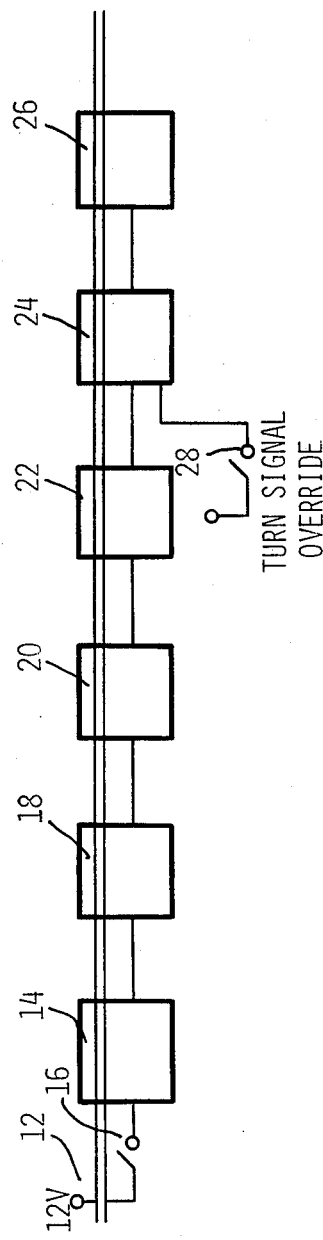
FIG. 1 is a block diagram of the present invention to flash the brake lights in a time delayed manner.

Referring now to the drawings, and in particular FIG. 1, wherein a block diagram illustrates the operation of the present invention. A power supply 12 energizes a time delay 14 when a brake switch 16 is closed. When the brake switch 16 is first closed the electrical current passes directly through the time delay 14, a gate 18, a blinker 20, a driver 22, and a power transistor 24 to the brake lights 26 which light. When the brake switch 16 is first closed the brake lights 26 respond to the brakes application or release in the conventional manner. Applying the brakes causes the brake lights to go on, and releasing the brakes causes the brake lights to go out. When the brake switch 16 has been closed for a predetermined length of time, the timer 14 activates the blinker 20 which cyclically interrupts the current causing the brake lights 26 to blink or flash on and off. A turn signal override switch 28 feeds into the power transistor 24 to allow the normal turn signal circuit to override the brake flasher and operate the turn indicator lights in a normal manner. When the brake switch 16 is opened the brake lights go out and the time delay 14 is reset.

Figure 2:
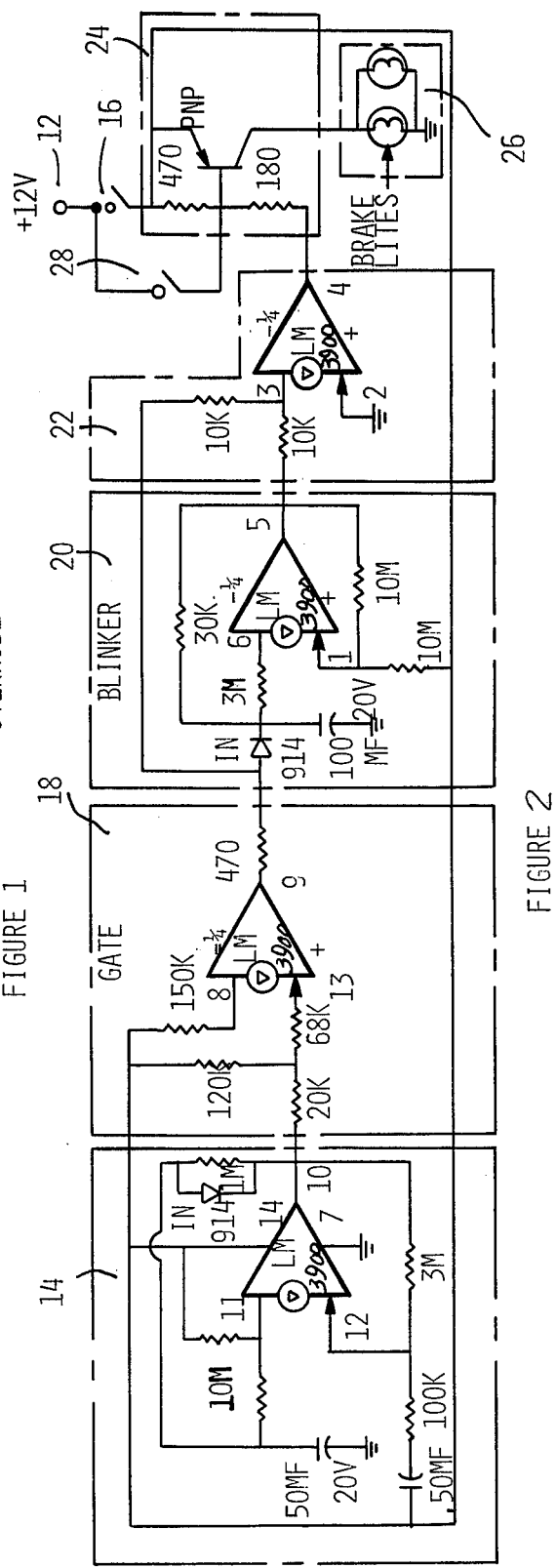
FIG. 2 is an electrical circuit diagram showing the details contained in the various blocks of FIG. 1.

FIG. 2 illustrates the details of the components in the various blocks of FIG. 1. All resistors in FIG. 1 are rated at ¼ W±10%. The power transistor is a PNP 40 V plastic package. The circuit of FIG. 2 is "fail safe" in that even if the various elements of the time delay and brake light flasher circuit should fail, the brake lights and turn indicator will continue to function normally because all elements interposed between the brake switch or the turn indicator switch and their corresponding lights are normally closed and would fail in their closed position.

FIG. 3 illustrates an embodiment of the block diagram of FIG. 1 wherein the time delay 14 is variable allowing the flashing to begin at varying times as determined by the vehicle operator, vehicle manufacturer or government agency. The time delay 14 is varied by a conventional variable resistor 14' adding a variable resistance in series with the RC series network connected to the inverting (−) input of the op-amp.

More specifically, the variable resistor 14' is added in series with the IM ohm resistor connected in series with the 0.50 mf capacitor between the output of the op-amp and ground. In this manner, the rate of build up of potential on the 0.50 mf capacitor, which determines the amount of time after the brakes are depressed before the output of the op-amp is switched and the lights begin to blink, can be varied as desired.

FIG. 4 is another embodiment of FIG. 3 wherein the variable time delay 14 is varied further in accordance with a vehicle input speed signal 15. When a motorist is following a vehicle at night and the vehicle has its tail lights on, he may not notice the brake lights if his attention has been momentarily diverted and the increase in brightness does not catch his notice. However, when the brake lights 26 begin to flash, he will know that the brake lights are on and be better able to avoid a collision. The optimum length of time delay for normal traffic situations from the time the brakes are first applied to when flashing of the brake lights begins would be two to three seconds, or whatever experience determines to be the optimum. At high speeds a longer time delay is preferrable due to the increased amount of time to bring the vehicle to a complete stop. The speed responsive variable time delay signal 15 of FIG. 4 renders the length of the time delay proportionate to the vehicle speed.

Specifically, a voltage inversely proportionate to the vehicle speed is developed through a resistor and is connected to the common junction between the IM resistor, with the variable resistor 14' connected in series therewith, and the 0.50 mf capacitor. In this manner, the rate of build up of potential on the 0.50 mf capacitor and the time after the brakes are depressed and the lights begin to blink is inversely proportionate to the speed of the vehicle.

The variable time delay input 15 illustrated in the block diagram of FIG. 3 provides a knob on the dash near the driver's seat to be adjusted by the driver.

Figure 5:
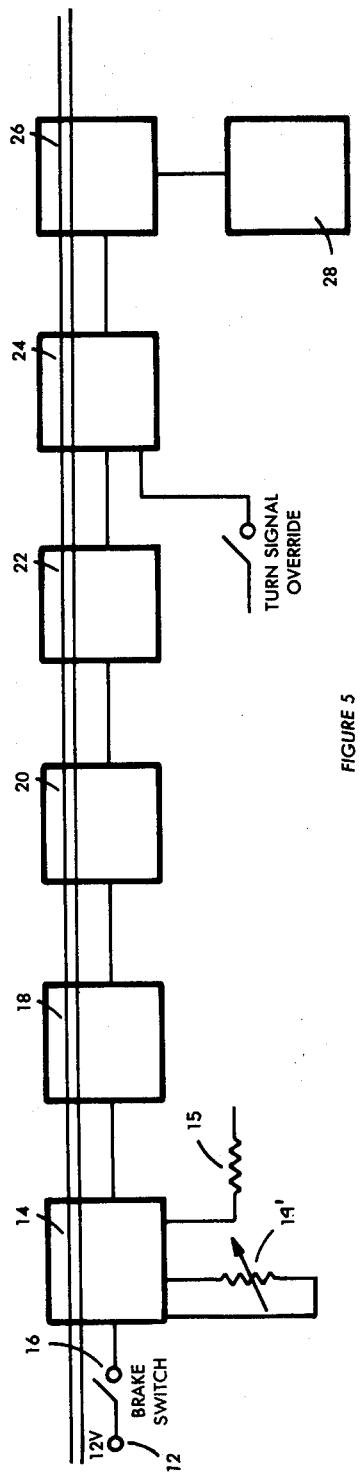
FIG. 5 illustrates another embodiment of the block diagram of FIG. 1 wherein the brake lights and turn indicator lights flash simultaneously.

The block diagram of FIG. 5 illustrates an embodiment of the present invention wherein the flasher circuit causes the turn indicator lights 28 on the front of the vehicle to flash with the brake lights to alert other vehicles that are disposed along side or in front of the braking vehicle. This is accomplished by interconnecting the flasher signal with the turn indicator lights.

Safety laws require that an audible signal be activated when large commercial vehicles are placed in reverse. The device of the present invention can also be connected to the audible signalling device when the brakes are applied for a prolonged time or operation in reverse to provide both an audio and visual signal.

In cases where traffic is moving slowly and the car is moving with the brakes off and the engine at idle, the stopped or braking vehicle signalling device can be kept activated by requiring the accelerator to be depressed or engine manifold pressure to be raised before the time delay 14 is reset by integrating a vacuum pressure switch with the brake switch. Both switches must be open before the time delay is reset.

Figure 6:
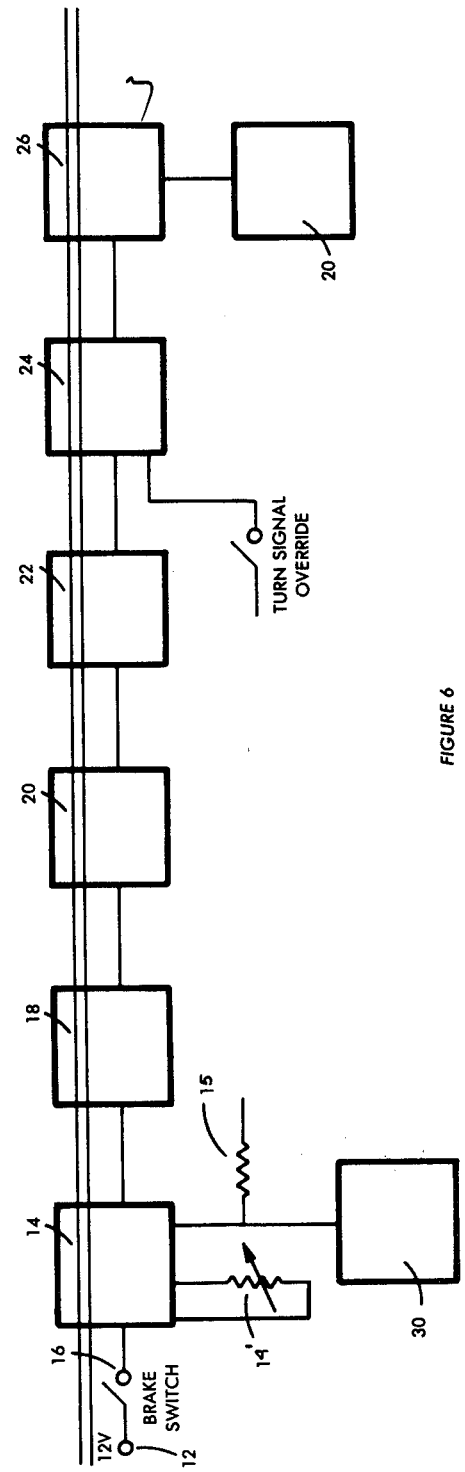
FIG. 6 illustrates a block diagram of FIG. 5 with an input signal responsive to the transmission being placed in reverse.

The signal of the present invention can be instantly activated when the vehicle is placed in reverse alerting motorists to the rear of the vehicle. FIG. 6 illustrates the circuit having an input signal 30 activated by the back up lights or other signal from the vehicle transmission.

All of the components listed in the circuit of FIG. 2 are commercially available and are in volume production in a form that requires little or no modification to be adaptable to the present invention. Flashers or blinkers 20 have been in use for many years as part of the turn indicators or the disabled vehicle circuit. Time delay circuits 14 have been used as an element in a seat belt warning circuit. The driver 26, gate 18 and power transistor 24, are all a combination of standard solid state electronic components readily available in commercial quantities at low cost.

I claim:

1. A stopped vehicle indicating device for use with a brake light on a vehicle which is lighted when the vehicle brakes are applied comprising:

timing means, responsive to the application of said vehicle brakes, for providing a time delayed output signal, said output signal being generated after a predetermined time delay after said vehicle brakes are applied and remaining present as long as said vehicle brakes are applied; and flasher means, responsive to the presence of said output signal of said timing means, for flashing said brake light on and off, as long as said output signal is present;

said flasher means and said timing means being reset when said brakes are released.

2. The stopped vehicle indicating device as described in claim 1 wherein:

said predetermined amount of time is adjustable over a range of times.

3. The stopped vehicle indicating device as described in claim 1 or claim 2 wherein:

said flasher means flashes other lights on said vehicle.

4. The stopped vehicle indicating device as described in claim 15 wherein said time delay is automatically varied in response to vehicle speed.

5. An electrical circuit for causing the brake light in a vehicle to flash in a time delayed manner comprising:

a power source, said power source being electrically connected to a switch having an open and a closed position, said switch, when closed, directing energy to a time delay means having a normally open and a closed position and a power transistor, when said time delay means is open the energy directed to the power transistor is directed to a brake light causing it to light, said time delay means switching to the closed position a predetermined amount of time after the switch has closed and directing energy to a gate, the gate energizing a blinker means which emits a pulsating energy signal to the power transistor causing the brake light to flash, opening said switch resets said time delay means.

6. The electrical circuit for causing the brake light in a vehicle to flash in a time delayed manner as defined in claim 5 further comprising:

a turn signal override switch having an open and a closed position, when said override switch is closed a turn signal output is directed to said power transducer to override the driver pulsating energy signal to said power transducer.

7. The electrical circuit for causing the brake light in a vehicle to flash in a time delayed manner as defined in claim 6 wherein:

said predetermined amount of time that said means switches to the closed position after the switch has switched to the closed position is manually adjustable.

8. The electrical circuit for causing the brake light in a vehicle to flash in a time delayed manner as defined in claim 7 wherein said time delay is modified be vehicle speed.

9. The electrical circuit for causing the brake lights in a vehicle to flash in a time delayed manner as defined in claim 6 wherein said time delay means is reset when the brakes are released and engine manifold pressure is increased.

10. The electrical circuit for causing the brake lights in a vehicle to flash in a time delayed manner as defined in claim 5 further including audio means for providing an audible signal in a vehicle when said vehicle is placed in reverse.

* * * * *